US 9,098,155 B2

(12) United States Patent
Hanssen et al.

(10) Patent No.: US 9,098,155 B2
(45) Date of Patent: Aug. 4, 2015

(54) SELF-CAPACITANCE MEASUREMENT USING COMPENSATION CAPACITOR

(71) Applicants: Ingar Hanssen, Trondheim (NO); Rian Whelan, Drogheda (IE)

(72) Inventors: Ingar Hanssen, Trondheim (NO); Rian Whelan, Drogheda (IE)

(73) Assignee: Atmel Corporation, San Jose, CA (US)

( * ) Notice: Subject to any disclaimer, the term of this patent is extended or adjusted under 35 U.S.C. 154(b) by 322 days.

(21) Appl. No.: 13/651,194

(22) Filed: Oct. 12, 2012

(65) Prior Publication Data

US 2014/0104223 A1 Apr. 17, 2014

(51) Int. Cl.
*G06F 3/044* (2006.01)

(52) U.S. Cl.
CPC ...................................... *G06F 3/044* (2013.01)

(58) Field of Classification Search
CPC ....................................................... G06F 3/044
USPC ................ 345/173–174; 178/18.06; 324/519, 324/750.17, 754.28, 584, 658, 686, 76.66, 324/382
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2008/0158175 A1* | 7/2008 | Hotelling et al. | 345/173 |
| 2009/0244014 A1* | 10/2009 | Hotelling et al. | 345/173 |
| 2009/0315854 A1 | 12/2009 | Matsuo | |
| 2011/0109585 A1* | 5/2011 | Kwon et al. | 345/174 |
| 2011/0148440 A1* | 6/2011 | Bruwer et al. | 324/684 |
| 2011/0234528 A1* | 9/2011 | Guedon et al. | 345/174 |
| 2011/0261005 A1* | 10/2011 | Joharapurkar et al. | 345/174 |
| 2012/0043971 A1* | 2/2012 | Maharyta | 324/658 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0088246 A1* | 4/2013 | Lundstrum et al. | 324/686 |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Allison Johnson
*Assistant Examiner* — Vinh Lam
(74) *Attorney, Agent, or Firm* — Baker Botts LLP (57) ABSTRACT

In one embodiment, a method includes dividing a first amount of charge between a measurement capacitance and a sample-and-hold capacitor resulting in a voltage at the measurement capacitance being a first voltage. The division of the first amount of charge is based at least in part on a configuration of a compensation capacitor relative to the measurement capacitance and the sample-and-hold capacitor. The configuration being determined based at least in part on an output without the compensation capacitor. The method also includes determining a first difference between the first voltage at the capacitance and a reference voltage; and determining whether a touch input to the touch sensor has occurred based at least in part on the first difference.

17 Claims, 5 Drawing Sheets

SELF-CAPACITANCE MEASUREMENT USING COMPENSATION CAPACITOR

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the touch sensor, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
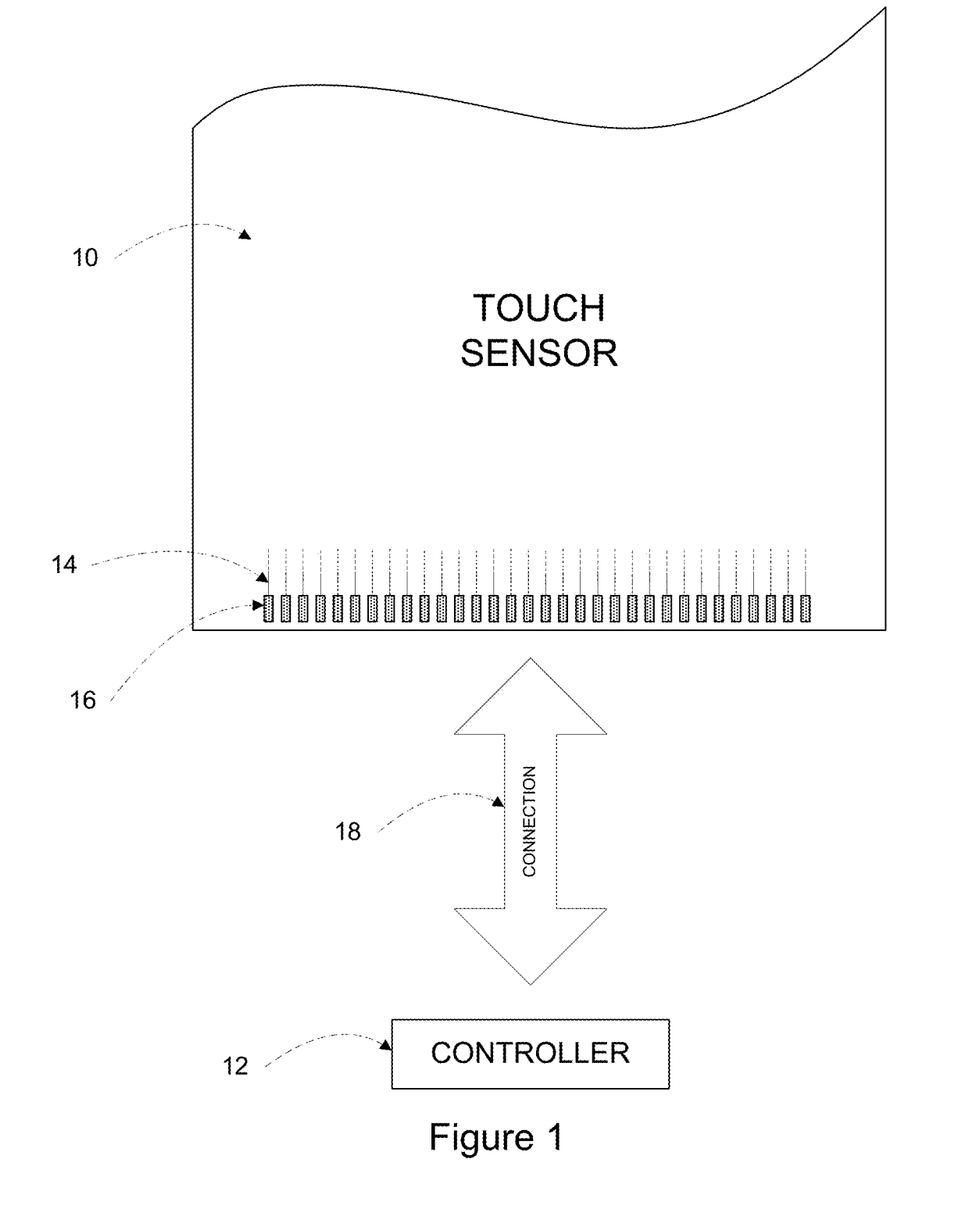
FIG. 1 illustrates an example array of touch sensors with an example touch-sensor controller.

FIG. 1 illustrates an example touch sensor array with an example touch-sensor controller. Touch sensor array 10 and touch-sensor controller 12 may detect the presence and location of a touch or the proximity of an object within a touch-sensitive area of touch sensor array 10. Herein, reference to a touch sensor array may encompass both the touch sensor and its touch-sensor controller, where appropriate. Similarly, reference to a touch-sensor controller may encompass both the touch-sensor controller and its touch sensor array, where appropriate. Touch sensor array 10 may include one or more touch-sensitive areas, where appropriate. Touch sensor array 10 may include an array of electrodes disposed on one or more substrates, which may be made of a dielectric material. Herein, reference to a touch sensor array may encompass both the electrodes of the touch sensor and the substrate(s) that they are disposed on, where appropriate. Alternatively, where appropriate, reference to a touch sensor array may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor array 10 may constitute in whole or in part one or more macro-features of the touch sensor array 10. One or more characteristics of the implementation of those shapes (such as, for example, the conductive materials, fills, or patterns within the shapes) may constitute in whole or in part one or more micro-features of the touch sensor array 10. One or more macro-features of a touch sensor array 10 may determine one or more characteristics of its functionality, and one or more micro-features of the touch sensor array 10 may determine one or more optical features of the touch sensor, such as transmittance, refraction, or reflection.

A mechanical stack may contain the substrate (or multiple substrates) and the conductive material forming the electrodes of touch sensor array 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor array 10 may be made of polyethylene terephthalate (PET) or another suitable material. This disclosure contemplates any suitable substrate with any suitable portions made of any suitable material. In particular embodiments, the electrodes in touch sensor array 10 may be made of ITO in whole or in part. In particular embodiments, the electrodes in touch sensor array 10 may be made of fine lines of metal or other conductive material. As an example and not by way of limitation, one or more portions of the conductive material may be copper or copper-based and have a thickness of approximately 5 microns ($\mu m$) or less and a width of approximately 10 $\mu m$ or less. As another example, one or more portions of the conductive material may be silver or silver-based and similarly have a thickness of approximately 5 $\mu m$ or less and a width of approximately 10 $\mu m$ or less. This disclosure contemplates any suitable electrodes made of any suitable material.

Touch sensor array 10 may implement a capacitive form of touch sensing. In a self-capacitance implementation, touch sensor array 10 may include an array of electrodes that may each form a capacitive node. A pulsed or alternating voltage applied to the electrode (by touch-sensor controller 12) may induce a charge on the electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array 10, touch-sensor controller 12 may determine the position of the touch or proximity within the touch-sensitive area(s) of touch sensor array 10. This disclosure contemplates any suitable form of capacitive touch sensing, where appropriate.

For a self-capacitance implementation, electrodes may be disposed in a pattern on a single substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor array 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor array 10 and touch-sensor controller 12, which may respond to the touch or proximity input by initiating a function of the device (or an application running on the device). Although this disclosure describes a particular touch-sensor controller having particular functionality with respect to a particular device and a particular touch sensor array, this disclosure contemplates any suitable touch-sensor controller having any suitable functionality with respect to any suitable device and any suitable touch sensor array.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor array 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the electrodes of touch sensor array 10. The sense unit may sense charge at the capacitive nodes of touch sensor array 10 and provide measurement signals to the processor unit representing capacitances at the capacitive nodes. The processor unit may control the supply of drive signals to the electrodes by the drive unit and process measurement signals from the sense unit to detect and process the presence and location of a touch or proximity input within the touch-sensitive area(s) of touch sensor array 10. The processor unit may also track changes in the position of a touch or proximity input within the touch-sensitive area(s) of touch sensor array 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor array 10 may couple the electrodes of touch sensor 10 to connection pads 16, also disposed on the substrate of touch sensor array 10. As described below, connection pads 16 facilitate coupling of tracks 14 to touch-sensor controller 12. Tracks 14 may extend into or around (e.g. at the edges of) the touch-sensitive area(s) of touch sensor array 10. Particular tracks 14 may provide drive connections for coupling touch-sensor controller 12 to electrodes of touch sensor array 10, through which the drive unit of touch-sensor controller 12 may supply drive signals to the electrodes. Other tracks 14 may provide sense connections for coupling touch-sensor controller 12 to electrodes of touch sensor 10, through which the sense unit of touch-sensor controller 12 may sense charge at the capacitive nodes of touch sensor array 10. Tracks 14 may be made of fine lines of metal or other conductive material. As an example and not by way of limitation, the conductive material of tracks 14 may be copper or copper-based and have a width of approximately 100 $\mu m$ or less. As another example, the conductive material of tracks 14 may be silver or silver-based and have a width of approximately 100

μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor array 10 may include one or more ground lines terminating at a ground connector (which may be a connection pad 16) at an edge of the substrate of touch sensor array 10 (similar to tracks 14).

Connection pads 16 may be located along one or more edges of the substrate, outside the touch-sensitive area(s) of touch sensor array 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the electrodes of touch sensor array 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
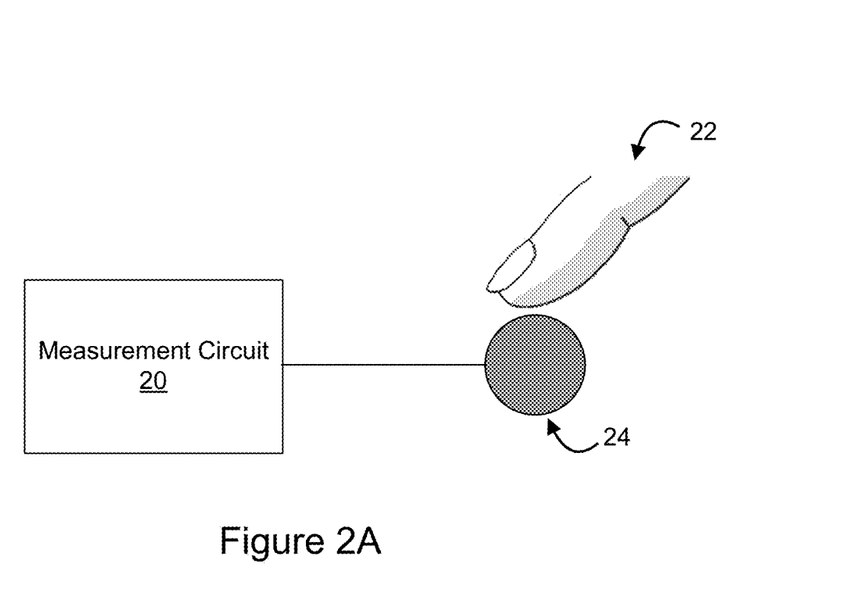
FIGS. 2A-B illustrate a schematic of an example self-capacitance measurement.
Figure 2B:
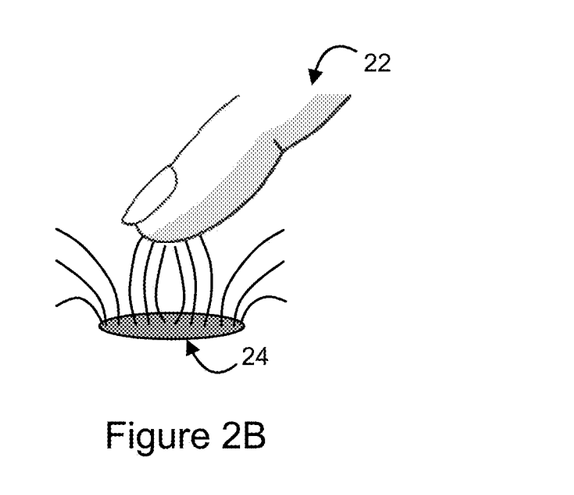

FIGS. 2A-B illustrate a schematic of an example self-capacitance measurement. In the example of FIG. 2A, an electrode 24 of the touch sensor is coupled to a measurement circuit 20. As described below, electrode 24 forms a capacitance to ground that is distributed in free space. In particular embodiments, the capacitance to ground may include multiple elements, such as for example, capacitance of the tracks in the silicon, tracks on the printed circuit board (PCB), electrodes 24 made from conductive material (ITO, copper mesh, etc.), or an object providing a touch input. Electrode 24 has capacitive coupling to ground through the surrounding objects that are galvanically or capacitively connected to ground. As described above, measurement circuit 20 of the touch-sensor controller transmits a drive signal and senses a signal indicative of a touch or proximity input, from for example a finger 22, through electrode 24. In particular embodiments, measurement circuit 20 of the touch-sensor controller generates the drive signal transmitted by electrode 24 and senses the capacitance to ground. The capacitance of the surrounding material includes at least in part, the capacitance between electrode 24 and ground with finger 22 providing the touch or proximity input. As an example and not by way of limitation, the capacitance provided by finger 22 providing the touch or proximity input may add 5-10% of the capacitance sensed by electrode 24.

In the example of FIG. 2B, the drive signal transmitted by electrode 24 generates an electric field that emanates from electrode 24 to a signal ground of the touch sensor. The signal ground is galvanically or capacitively coupled to ground. The presence of finger 22 affects the electric field and in turn the amount of charge sensed at electrode 24 by measurement circuit 20. As finger 22 approaches electrode 24, the capacitance between electrode 24 and ground detected by measurement circuit 20 increases. In particular embodiments, the increase of the capacitance between electrode 24 and ground may be measured by measurement circuit 20 as a decrease of voltage at the capacitance between electrode 24 and ground. Although this disclosure describes the measurement circuit being integrated with a touch-sensor controller, this disclosure contemplates a measurement circuit being a discrete circuit or part of any suitable circuit.

Figure 3:
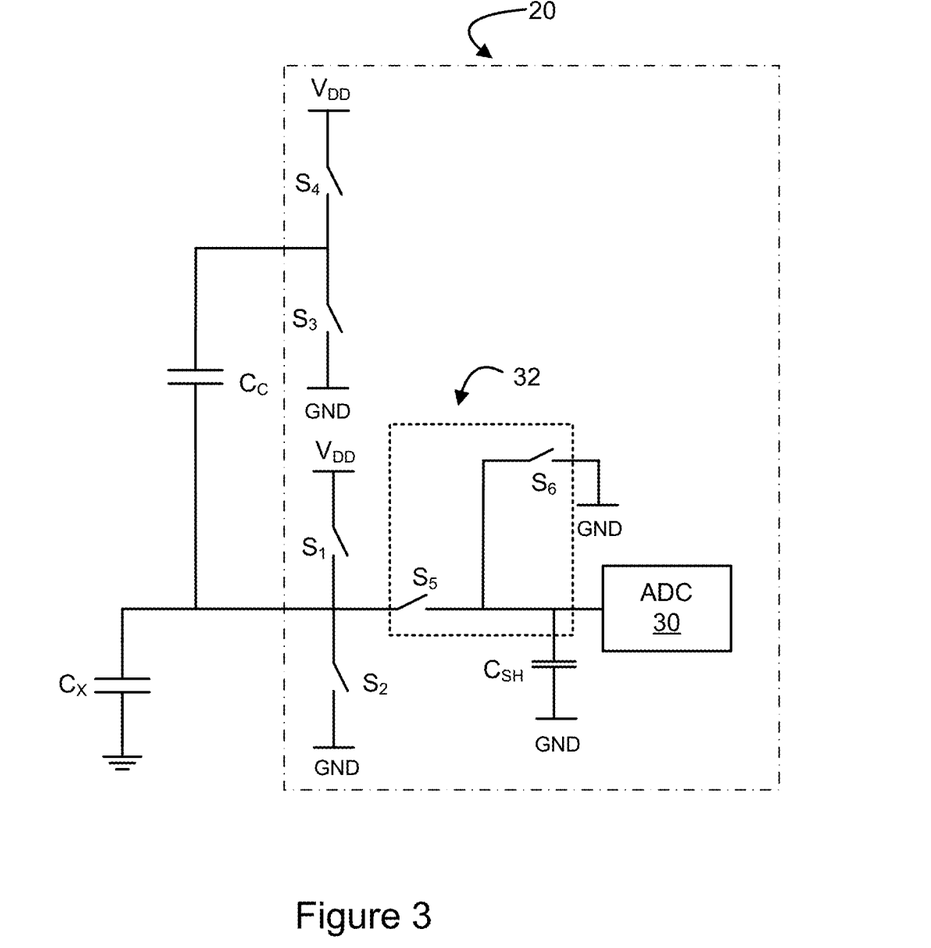
FIG. 3 illustrates an example circuit schematic with an internal chip compensation capacitor for self-capacitance measurements.

FIG. 3 illustrates an example circuit schematic with an external compensation capacitor for self-capacitance measurements. Self-capacitance measurement circuit 20 determines a change of a touch sensor capacitance schematically illustrated in the example of FIG. 3 by measurement capacitance $C_X$. In particular embodiments, measurement capacitance $C_X$ is formed in part between an electrode of the touch sensor and other conductive material of the touch sensor (not shown) that is capacitively or galvanically coupled to ground. As an example and not by way of limitation, the conductive material of the touch sensor may include portions of tracks, pins, or internal network of the touch sensor. As described above, the electrode of the touch sensor senses the capacitance between the finger providing the touch or proximity input through the electric field transmitted by the electrode.

The portion of measurement capacitance $C_X$ that includes the electrode is coupled to a voltage $V_{DD}$ or ground through switches $S_1$ and $S_2$, respectively. One terminal of compensation capacitor $C_C$ is coupled to voltage $V_{DD}$ or ground through switches $S_3$ and $S_4$, respectively. The other terminal of compensation capacitor $C_C$ is coupled to measurement capacitance $C_X$. In particular embodiments, compensation capacitor $C_C$ is external to measurement circuit 20. Measurement circuit 20 includes an analog-to-digital multiplexer (AD-MUX) 32 controlling the input to analog-to-digital converter (ADC) 30. AD-MUX 32 couples one terminal of sample-and-hold capacitor $C_{SH}$ to voltage $V_{DD}$ or ground through switches $S_7$ and $S_6$, respectively. Compensation capacitor $C_C$ and measurement capacitance $C_X$ are coupled to ADC 30 and sample-and-hold capacitor $C_{SH}$ through switch $S_5$ of AD-MUX 32. In particular embodiments, voltage $V_{DD}$ is the supply voltage of the touch sensor. Although this disclosure describes and illustrates a particular arrangement of particular components for the measurement circuit and compensation capacitor, this disclosure contemplates any suitable arrangement of any suitable components for the measurement circuit and compensation capacitor.

In particular embodiments, the configuration of compensation capacitor $C_C$ relative to measurement capacitance $C_X$ and sample-and-hold capacitor $C_{SH}$ may be modified through AD-MUX 32. As an example and not by way of limitation, compensation capacitor $C_C$ may be coupled in series to measurement capacitance $C_X$. As described below, coupling compensation capacitor $C_C$ in series with measurement capacitance $C_X$ may compensate the difference in capacitance between measurement capacitance $C_X$ and sample-and-hold capacitor $C_{SH}$. In particular embodiments, the configuration of compensation capacitor $C_C$ relative to measurement capacitance $C_X$ and sample-and-hold capacitor $C_{SH}$ may be determined based on the output of ADC 30 without compensation capacitor $C_C$, as described below.

Figure 4A:
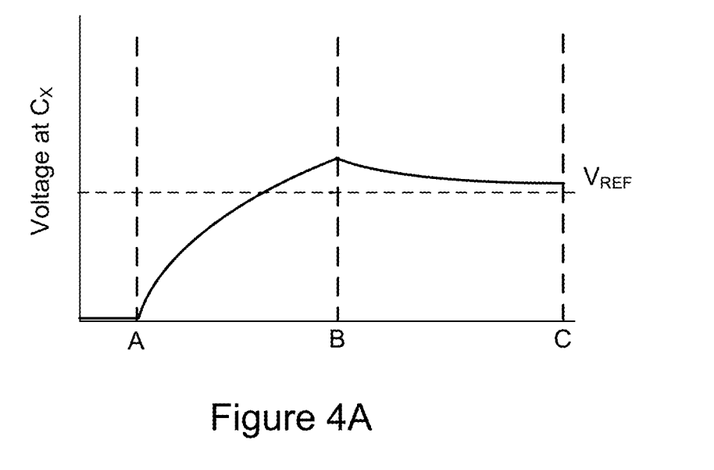
FIGS. 4A-B illustrate the voltage at a measurement capacitance for an example self-capacitance measurement with a compensation capacitor.
Figure 4B:
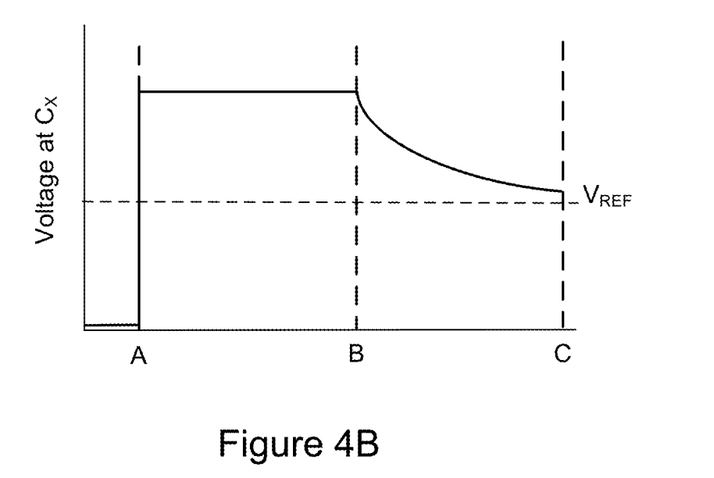

FIGS. 4A-B illustrate the voltage at a measurement capacitance for an example self-capacitance measurement with a compensation capacitor. In the example of FIG. 4A, the capacitance of measurement capacitance $C_X$ is larger than the capacitance of the sample-and-hold capacitor $C_{SH}$. Prior to time point A, the amount of charge of measurement capacitance $C_X$ is modified by switch $S_2$ resulting in the voltage at measurement capacitance $C_X$ being a pre-determined voltage. The amount of charge at sample-and-hold capacitor $C_{SH}$ is modified by switch $S_6$ resulting in the voltage at measurement capacitance $C_X$ being a pre-determined voltage. As an example and not by way of limitation, the pre-determined voltage may be ground. At time point A, compensation capacitor $C_C$ is coupled in series with measurement capacitance $C_X$ through application of a voltage to compensation capacitor $C_C$ through switch $S_4$. The applied voltage precharges measurement capacitance $C_X$ through compensation capacitor $C_C$ and results in an amount of charge being divided between measurement capacitance $C_X$ and compensation capacitor $C_C$. In particular embodiments, the voltage applied to compensation capacitor $C_C$ is a voltage of the power supply of the touch sensor.

The division of the amount of charge is based at least in part on the configuration of compensation capacitor $C_C$ relative to measurement capacitance $C_X$. Compensation capacitor $C_C$ is coupled in series with measurement capacitance $C_X$, thereby substantially compensating the capacitance difference between measurement capacitance $C_X$ and sample-and-hold capacitor $C_{SH}$, as described below. As described above, a touch or proximity input on the electrode of the touch sensor affects the amount of charge of measurement capacitance $C_X$. In the case when the sum of capacitance of compensation capacitor $C_C$ and sample-and-hold capacitor $C_{SH}$ is substantially equal to measurement capacitance $C_X$, the amount of charge is substantially equally divided between measurement capacitance $C_X$ and sample-and-hold capacitor $C_{SH}$ with some charge also being stored on sample-and-hold capacitor $C_{SH}$ due to compensation capacitor $C_C$.

In particular embodiments, the uncompensated measurement circuit (i.e. without compensation capacitor $C_C$) may be designed for the output of the ADC after the charge division to be approximately equal to a reference voltage $V_{REF}$ when measurement capacitance $C_X$ is approximately equal to sample-and-hold capacitor $C_{SH}$. As an example and not by way of limitation, reference voltage $V_{REF}$ is substantially equal to half of the voltage of the power supply of the touch sensor. The voltage at measurement capacitance $C_X$ coupled to the input to the ADC may be approximated by the following equation:

$$V = V_{SUPPLY} \frac{C_{SH}}{(C_{SH} + C_X)} \quad (1)$$

$V_{SUPPLY}$ is the voltage of the power supply of the touch sensor. In cases where measurement capacitance $C_X$ is substantially different than sample-and-hold capacitor $C_{SH}$, the voltage at measurement capacitance $C_X$ may deviate significantly from reference voltage $V_{REF}$. As an example when sample-and-hold capacitor $C_{SH}$ has a capacitance of 14 pF, measurement capacitance $C_X$ has a capacitance of 56 pF, the voltage at measurement capacitance $C_X$ (without compensation capacitor $C_C$) after the division is approximately 80% of $V_{SUPPLY}$.

As described above, coupling compensation capacitor $C_C$ either in parallel or in series with measurement capacitance $C_X$ may compensate the capacitance difference between measurement capacitance $C_X$ and sample-and-hold capacitor $C_{SH}$. The voltage at measurement capacitance $C_X$ with compensation capacitor $C_C$ coupled in parallel to measurement capacitance $C_X$ may be approximated by the following equation:

$$V = V_{SUPPLY} \frac{C_X + C_C}{(C_X + C_C) + C_{SH}} \quad (2)$$

The voltage at measurement capacitance $C_X$ with compensation capacitor $C_C$ coupled in series with measurement capacitance $C_X$ may be approximated by the following equation:

$$V = V_{SUPPLY} \frac{C_C}{(C_X + C_{SH}) + C_C} \quad (3)$$

Using the values of measurement capacitance $C_X$ and sample-and-hold capacitor $C_{SH}$ described above and compensation capacitor $C_C$ with a capacitance of 70 pF, the voltage at measurement capacitance $C_X$ from equation (3) is approximately 50% of $V_{SUPPLY}$, which is equal to reference voltage $V_{REF}$.

In the presence of the touch or proximity input, the perceived capacitance of measurement capacitance $C_X$ is increased by the capacitance between the portion of the human hand (e.g. a finger) and the electrode of the touch sensor. In this case, the resulting voltage at measurement capacitance $C_X$ is lower than the voltage in the absence of the touch or proximity input on the electrode. In the example of FIG. 4A, at time point B, measurement capacitance $C_X$ is coupled in parallel to sample-and-hold capacitor $C_{SH}$ and the voltage at measurement capacitance $C_X$ after the pre-charge may be higher than reference voltage $V_{REF}$. The voltage at measurement capacitance $C_X$ after the pre-charge is proportional to the difference in capacitance between measurement capacitance $C_X$ and compensation capacitor $C_C$ taking into account the configuration of compensation capacitor $C_C$ relative to measurement capacitance $C_X$. The voltage of measurement capacitance $C_X$ is modified by sample-and-hold capacitor $C_{SH}$ after closing switch $S_5$. As an example and not by way of limitation, transferring a portion of the charge from measurement capacitance $C_X$ to sample-and-hold capacitor $C_{SH}$ may decrease the voltage at measurement capacitance $C_X$. In particular embodiments, the voltage at measurement capacitance $C_X$ may be measured by the ADC when switch $S_5$ is closed. The difference between the voltage at measurement capacitance $C_X$ after charge division and reference voltage $V_{REF}$ may be measured using the ADC output, as described below. In particular embodiments, a touch or proximity input may be determined relative to a calibration voltage difference between the measured voltage at measurement capacitance $C_X$ after charge division and reference voltage $V_{REF}$ in the absence of a touch or proximity input.

In the example of FIG. 4A, between time points A and B, measurement capacitance $C_X$ is coupled in series with compensation capacitor $C_C$. Measurement capacitance $C_X$ may be pre-charged through compensation capacitor $C_C$ by closing switch $S_4$. As an example and not by way of limitation, the voltage at compensation capacitor $C_C$ may be the voltage of the power supply of the touch sensor and the voltage at measurement capacitance $C_X$ may be determined by the capacitance of compensation capacitor $C_C$ relative to the measurement capacitance $C_X$. The charge of sample-and-hold capacitor $C_{SH}$ is modified through switch $S_6$ such that the voltage at sample-and-hold capacitor $C_{SH}$ may be ground. At time point B, when compensation capacitor $C_C$ is coupled in series to measurement capacitance $C_X$, the amount of charge from the application of the pre-determined voltage is divided between measurement capacitance $C_X$, compensation capacitor $C_C$, and sample-and-hold capacitor $C_{SH}$ through switches $S_4$ and $S_5$.

TABLE 1 illustrates an example sequence of operations for the example self-capacitance measurement circuit of FIG. 3 with compensation capacitor $C_C$ in series with measurement capacitance $C_X$. Step 2 applies a voltage to compensation capacitor $C_C$ coupled in series with measurement capacitance $C_X$. Pre-charging measurement capacitance $C_X$ through compensation capacitor $C_C$ modifies the voltage at measurement capacitance $C_X$ to a voltage that is proportional to the capacitance of compensation capacitor $C_C$ relative to measurement capacitance $C_X$. Step 3 measures the voltage at measurement capacitance $C_X$ after the charge division through the ADC, as described above. As described above, the distribution of charge and therefore the voltage at measurement capacitance $C_X$ may depend at least in part on whether a touch or proximity input is present on the electrode of the touch sensor. In particular embodiments, a touch input is determined based at least in part on the voltage at measurement capacitance $C_X$ relative to a reference value. Although this disclosure describes and illustrates a particular sequence of steps in TABLE 1, this disclosure contemplates any suitable sequence of steps for performing self-capacitance measurements.

to sample-and-hold capacitor $C_{SH}$. As an example and not by way of limitation, the transfer of charge from measurement capacitance $C_X$ to sample-and-hold capacitor $C_{SH}$ may decrease the voltage at measurement capacitance $C_X$.

As described above, the voltage at measurement capacitance $C_X$ after the charge division may be measured directly using the ADC output through switch $S_5$. The touch or proximity input may be determined at least in part by the measured voltage at measurement capacitance $C_X$ after the charge division relative to a reference value in the absence of a touch or proximity input. Although this disclosure describes and illus-

TABLE 1

| Step | $S_1$ | $S_2$ | $S_3$ | $S_4$ | $S_5$ | $S_6$ | Description |
|---|---|---|---|---|---|---|---|
| 1 | off | on | on | off | off | on | Discharge sample and hold capacitor $C_{SH}$, measurement capacitance Cx, and compensation capacitor Cc |
| 2 | on | off | off | on | off | on | Couple compensation capacitor Cc in series with measurement capacitance Cx; and pre-charge measurement capacitance Cx though compensation capacitor Cc |
| 3 | off | off | off | on | on | off | Divide charge between measurement capacitance $C_X$, sample and hold capacitor $C_{SH}$, and compensation capacitor $C_C$; and measure voltage at measurement capacitance $C_X$ after charge division Determine touch input based on the ADC reading | on = closed switch
off = open switch

In the example of FIG. 4B, the capacitance of measurement capacitance $C_X$ is smaller than the capacitance of sample-and-hold capacitor $C_{SH}$. At time point A, compensation capacitor $C_C$ is virtually coupled in parallel with measurement capacitance $C_X$ through switch $S_3$, and a voltage is applied to measurement capacitance $C_X$ and compensation capacitor $C_C$ through switch $S_1$. The application of the voltage at compensation capacitor $C_C$ results in pre-charging measurement capacitance $C_X$ and compensation capacitor $C_C$ to a pre-determined voltage. In particular embodiments, the pre-determined voltage is a voltage of the power supply of the touch sensor. In particular embodiments, coupling compensation capacitor $C_C$ in parallel to measurement capacitance $C_X$ substantially compensates the capacitance difference between measurement capacitance $C_X$ and sample-and-hold capacitor $C_{SH}$, as described below.

In the example of FIG. 4B, between time points B and C, the amount of charge of measurement capacitance $C_X$, compensation capacitor $C_C$, and sample-and-hold capacitor $C_S$ is modified through charge sharing between measurement capacitance $C_X$, compensation capacitor $C_C$, and sample-and-hold capacitor $C_{SH}$ by closing switch $S_5$. At time point C, the amount of charge from the application of the pre-determined voltage has been divided between measurement capacitance $C_X$, compensation capacitor $C_C$, and sample-and-hold capacitor $C_{SH}$. In the example of FIG. 4B, the division of charge may result in the voltage at measurement capacitance $C_X$ being lower than reference voltage $V_{REF}$ based at least in part on the capacitance matching between the combination of measurement capacitance $C_X$ and compensation capacitor $C_C$ relative trates particular differences between the voltage levels after the various divisions of charge relative to the reference voltage, such as for example the voltage after the charge division being higher than the reference voltage, this disclosure contemplates any suitable difference between the voltage after the divisions of charge relative to the reference voltage, including such as for example a voltage after charge division that is higher, lower or substantially equal to the reference voltage, depending on the matching between the combination of measurement capacitance $C_X$ and compensation capacitor $C_C$, and sample-and-hold capacitor $C_{SH}$.

TABLE 2 illustrates an example sequence of operations for the example self-capacitance measurement circuit of FIG. 3 with compensation capacitance in parallel with sample-and-hold capacitor $C_{SH}$. Step 2 applies a voltage to compensation capacitor $C_C$ coupled in parallel with measurement capacitance $C_X$ resulting in a voltage at being a pre-determined voltage. As described above, the distribution of charge depends at least in part on whether a touch or proximity input is present on the electrode of the touch sensor. Step 3 measures the voltage at measurement capacitance $C_X$ after the charge division through the ADC, as described above. As described above, the distribution of charge and therefore the voltage at measurement capacitance $C_X$ may depend at least in part on whether a touch or proximity input is present on the electrode of the touch sensor. Although this disclosure describes and illustrates a particular sequence of steps in TABLE 2, this disclosure contemplates any suitable sequence of steps for performing self-capacitance measurements.

TABLE 2

| Step | $S_1$ | $S_2$ | $S_3$ | $S_4$ | $S_5$ | $S_6$ | Description |
|---|---|---|---|---|---|---|---|
| 1 | off | on | on | off | off | off | Discharge sample and hold capacitor $C_{SH}$, measurement capacitance Cx, and compensation capacitor Cc |

TABLE 2-continued

| Step | $S_1$ | $S_2$ | $S_3$ | $S_4$ | $S_5$ | $S_6$ | Description |
|---|---|---|---|---|---|---|---|
| 2 | on | off | off | on | off | on | Couple compensation capacitor Cc in parallel with measurement capacitance Cx; and pre-charge measurement capacitance Cx and compensation capacitor Cc |
| 3 | off | off | off | on | on | off | Divide charge between measurement capacitance $C_X$, sample and hold capacitor $C_{SH}$, and compensation capacitor $C_C$; and measure voltage at measurement capacitance $C_X$ after charge division Determine touch input based on the ADC reading | on = closed switch
off = open switch

As described above, the measurement circuit may be configured such that the output of the ADC after each charge division is approximately equal to a reference voltage $V_{REF}$. In particular embodiments, the configuration of compensation capacitor $C_C$ relative to measurement capacitance $C_X$ and sample-and-hold capacitor $C_{SH}$ may be determined at least in part on the output of the ADC without compensation capacitor $C_C$. As an example and not by way of limitation, the output of the ADC being higher than reference voltage $V_{REF}$ may indicate measurement capacitance $C_X$ is smaller than sample-and-hold capacitor $C_{SH}$. In particular embodiments, compensation capacitor $C_C$ may be configured in parallel with measurement capacitance $C_X$ if the output of the ADC without compensation capacitor $C_C$ is lower than reference voltage $V_{REF}$ by more than a pre-determined value.

Figure 5:
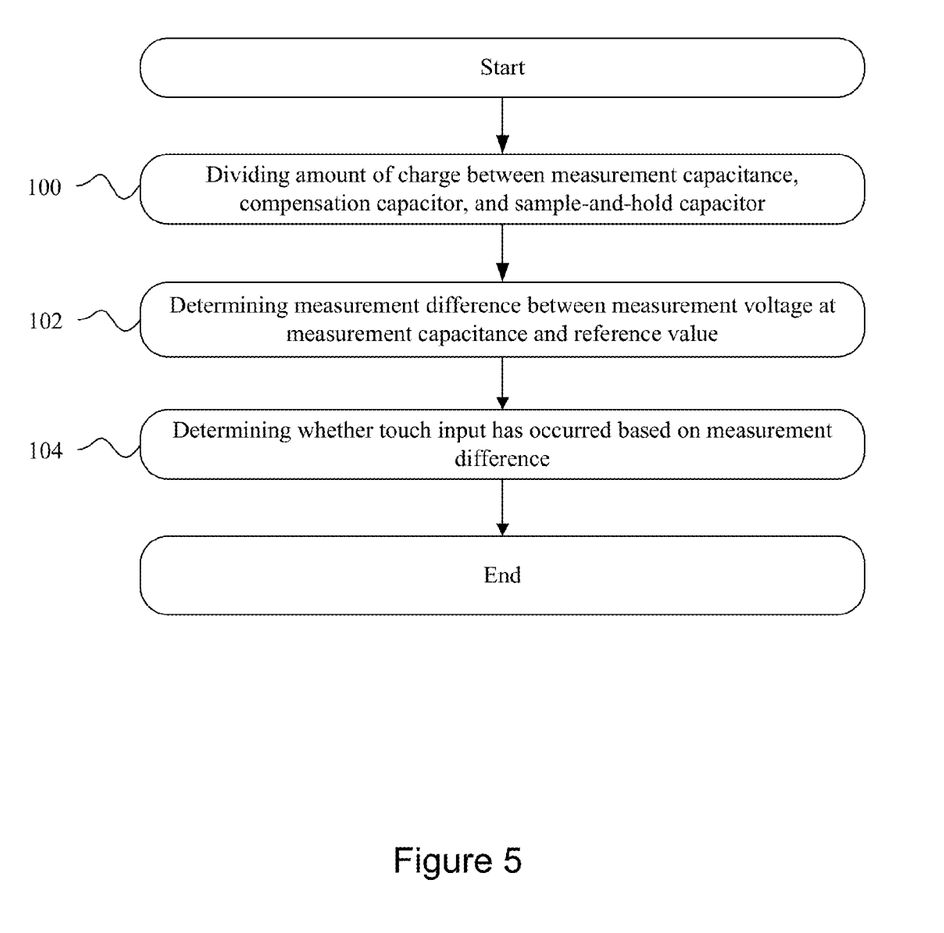
FIG. 5 illustrates an example method for self-capacitance measurements.

FIG. 5 illustrates an example method for self-capacitance measurements. The method may start at step 100, where an amount of charge is divided between a measurement capacitance, compensation capacitor, and a sample-and-hold capacitor. The division of charge results in a voltage at the measurement capacitance being a measurement voltage. The division of the amount of charge is based at least in part on a configuration of a compensation capacitor relative to the measurement capacitance. In particular embodiments, the configuration is determined based at least in part on an output without the compensation capacitor. Step 102 determines a measurement difference between the measurement voltage at the measurement capacitance and a reference value. In particular embodiments, the measurement voltage at the capacitance is determined at least in part on the capacitance of the measurement capacitance relative to the sample-and-hold capacitor. At step 104, whether a touch input to the touch sensor has occurred is determined based at least in part on the measurement difference, at which point the method may end. In particular embodiments, the output of the measurement circuit is compared to an output value without a touch or proximity input. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    configuring a compensation capacitor relative to a measurement capacitance based at least in part on a value of a calibration voltage relative to a reference value, wherein configuring the compensation capacitor comprises coupling the compensation capacitor in parallel with the measurement capacitance in response to the calibration voltage being lower than the reference value;
    dividing an amount of charge between the measurement capacitance, a sampling capacitor, and the compensation capacitor resulting in a voltage at the measurement capacitance being a measurement voltage, the division of the amount of charge being based at least in part on the configuration of the compensation capacitor relative to the measurement capacitance;
    determining a measurement difference between the measurement voltage at the measurement capacitance and a reference value; and determining whether a touch input to a touch sensor has occurred based at least in part on the measurement difference.

2. The method of claim 1, further comprising determining the configuration at least in part by a value of a calibration voltage relative to the reference value, the calibration voltage being measured without the touch input and the compensation capacitance.

3. The method of claim 2, further comprising reconfiguring the compensation capacitor relative to the measurement capacitance, wherein reconfiguring the compensation capacitor comprises coupling the compensation capacitor in series with the measurement capacitance in response to the calibration voltage becoming higher than the reference value by least a pre-determined value.

4. The method of claim 1, wherein the determination of whether a touch input has occurred comprises comparing the measurement difference to a measurement difference without the touch input.

5. The method of claim 1, further comprising sampling the measurement voltage through an analog-to-digital converter (ADC).

6. The method of claim 1, further comprising pre-charging the measurement capacitance based at least in part on the configuration of the compensation capacitor relative to the measurement capacitance.

7. A computer-readable non-transitory storage medium embodying logic configured when executed to:
configure a compensation capacitor relative to a measurement capacitance based at least in part on a value of a calibration voltage relative to a reference value, wherein configuring the compensation capacitor comprises coupling the compensation capacitor in parallel with the measurement capacitance in response to the calibration voltage being lower than the reference value;
divide an amount of charge between the measurement capacitance, a sampling capacitor, and the compensation capacitor resulting in a voltage at the measurement capacitance being a measurement voltage, the division of the amount of charge being based at least in part on the configuration of the compensation capacitor relative to the measurement capacitance;
determine a measurement difference between the measurement voltage at the measurement capacitance and a reference value; and
determine whether a touch input to a touch sensor has occurred based at least in part on the measurement difference.

8. The medium of claim 7, wherein the logic is further configured to
determine the configuration at least in part by a value of a calibration voltage relative to the reference value, the calibration voltage being measured without the touch input and the compensation capacitance.

9. The medium of claim 8, wherein the logic is further configured to reconfigure the compensation capacitor relative to the measurement capacitance, wherein reconfiguring the compensation capacitor comprises coupling the compensation capacitor in series with the measurement capacitance in response to the calibration voltage becoming higher than the reference value by least a pre-determined value.

10. The medium of claim 7, wherein the logic is further configured to compare the measurement difference to a measurement difference without the touch input.

11. The medium of claim 7, wherein the logic is further configured to sample the measurement voltage through an analog-to-digital converter (ADC).

12. The medium of claim 7, wherein the logic is further configured to pre-charge the measurement capacitance based at least in part on the configuration of the compensation capacitor relative to the measurement capacitance.

13. A device comprising:
a measurement circuit; and
a computer-readable non-transitory storage medium coupled to the measurement circuit and embodying logic configured when executed to:
configure a compensation capacitor relative to a measurement capacitance based at least in part on a value of a calibration voltage relative to a reference value, wherein configuring the compensation capacitor comprises coupling the compensation capacitor in parallel with the measurement capacitance in response to the calibration voltage being lower than the reference value;
divide an amount of charge between the measurement capacitance, a sampling capacitor, and the compensation capacitor resulting in a voltage at the measurement capacitance being a measurement voltage, the division of the amount of charge being based at least in part on the configuration of the compensation capacitor relative to the measurement capacitance;
determine a measurement difference between the measurement voltage at the measurement capacitance and a reference value; and
determine whether a touch input to a the touch sensor has occurred based at least in part on the measurement difference.

14. The device of claim 13, wherein the logic is further configured to
determine the configuration at least in part by a value of a calibration voltage relative to the reference value, the calibration voltage being measured without the touch input and the compensation capacitance.

15. The device of claim 14, wherein the logic is further configured to reconfigure the compensation capacitor relative to the measurement capacitance, wherein reconfiguring the compensation capacitor comprises coupling the compensation capacitor in series with the measurement capacitance in response to the calibration voltage becoming higher than the reference value by least a pre-determined value.

16. The device of claim 13, wherein the logic is further configured to compare the measurement difference to a measurement difference without the touch input.

17. The device of claim 13, wherein the logic is further configured to pre-charge the measurement capacitance based at least in part on the configuration of the compensation capacitor relative to the measurement capacitance.

* * * * *